UNITED STATES PATENT OFFICE.

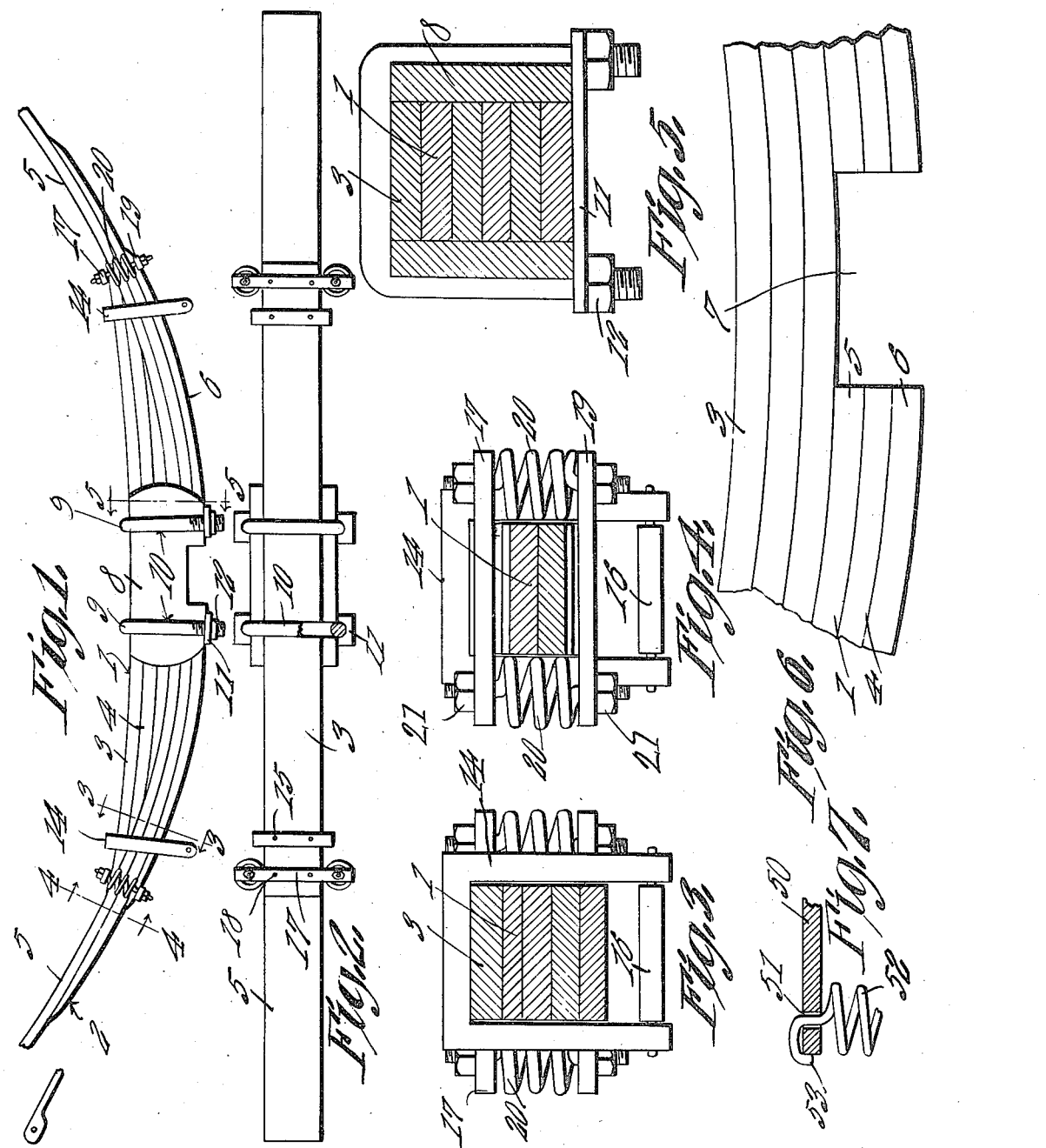

ALLISON MOFFITT, OF GALETON, PENNSYLVANIA, ASSIGNOR OF ONE-FOURTH TO JOHN DILLON, ONE-FOURTH TO WILLIAM WARD, AND ONE-FOURTH TO MEADE C. FRANCIS, ALL OF GALETON, PENNSYLVANIA.

SPRING.

1,150,289.  Specification of Letters Patent.  Patented Aug. 17, 1915.

Application filed May 20, 1915.  Serial No. 29,356.

*To all whom it may concern:*

Be it known that I, ALLISON MOFFITT, a citizen of the United States, residing at Galeton, in the county of Potter and State of Pennsylvania, have invented a new and useful Spring, of which the following is a specification.

The device forming the subject matter of this application is a spring for vehicles, and the invention aims to provide novel means whereby such springs may be reinforced to withstand shocks imposed thereon as the vehicle body reciprocates forcibly, an operation taking place, as is commonly understood, when the vehicle traverses uneven ground.

The invention aims to provide novel means whereby, through the instrumentality of supplemental springs disposed transversely of the main and auxiliary springs, strains suddenly imposed upon the main and auxiliary springs may be taken care of.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in side elevation; Fig. 2 is a top plan; Fig. 3 is a cross section on the line 3—3 of Fig. 1; Fig. 4 is a cross section on the line 4—4 of Fig. 1; Fig. 5 is a cross section on the line 5—5 of Fig. 1; Fig. 6 is a fragmental side elevation of the main and auxiliary springs; Fig. 7 is a sectional detail illustrating a modified form of the invention.

In carrying out the present invention there is provided a main spring 1 and an auxiliary spring 2. The main spring 1 comprises an upper leaf 3 and underlying leaves 4, the leaves 4 decreasing successively in length. The auxiliary spring 2 comprises an upper leaf 5 and underlying leaves, the lowermost leaf being denoted by the numeral 6 and the leaves decreasing successively in length as they extend downwardly. The leaves of the upper or main spring 1 are fashioned in continuous length, whereas the leaves of the lower or auxiliary spring are fashioned in two lengths, the same being spaced apart, as clearly indicated at 7 in Fig. 6, to define an opening which is adapted to receive an axle (not shown.) To the leaves of both springs, side plates 8 are applied, the same being held in place by means of U-bolts 9, the side plates being grooved if desired as shown at 10, to receive the vertical arms of the U-bolts. The lower ends of the U-bolts 9 extend through clamp strips 11 bearing on the lower leaf 6 of the auxiliary spring 2, and mounted on the lower ends of the arms of the U-bolts 9 are nuts 12 which bear upon the clamp strips 11. Thus, the leaves of the two springs are held together intermediate the ends of the springs.

U-shaped yokes 14 inclose the springs 1 and 2, the yokes being attached to the upper leaf 3 of the main spring 1 near the ends thereof, by means of securing elements 15 of any desired sort. The lower ends of the side arms of the yokes 14 may carry rollers 16 adapted to coöperate with the lower leaves 6 of the auxiliary spring 2.

Extended across the upper leaf 3 of the main spring 1 at its ends are supporting strips 17, the same being held in place by means of securing elements 18. Lower supporting strips 19 are attached to the lower leaf 6 of the auxiliary spring 2 near to the ends of the said leaf. Helical supplemental springs 20 lie at the sides of the springs 1 and 2, the ends of the springs 20 passing through the supporting strips 17 and 19. Nuts 21 are mounted on the ends of the springs 20 and coöperate with the supporting strips.

In practical operation, as the ends of the auxiliary spring 2 move downwardly, the auxiliary spring tends to separate from the main spring 1, and, under such circumstances, the supplemental springs 20 are put under tension, thereby to lessen the shocks imposed on the structure. Under extreme strains, the lower leaf 6 of the auxiliary spring 2 contacts with the rollers 16 which are carried by the lower ends of yokes 14.

Although the structure has been shown in the drawings as being downwardly curved, it will be understood that the same may be reversed and be used in an upwardly curved position. Likewise two of the springs of the sort shown in Fig. 1 may be united to form a lens-shaped spring of common and well known type.

The use of the nuts 21 on the ends of the supplemental springs 20 is not mandatory. Thus, as shown in Fig. 7, the supplemental springs 52 are shown as provided with eyes or hooks 53 passing through openings 51 in the supporting strips 50 these elements being represented by the strips 17 and 19 in the form of invention first discussed.

It is to be understood that the hooks 53 may be shaped as is found expedient in order to provide a secure mounting for the ends of the springs.

Having thus described the invention, what is claimed is:—

1. In a device of the class described, a main spring; an auxiliary spring; supplemental springs disposed transversely of the main and auxiliary springs; means for connecting the supplemental springs to the main spring adjacent its ends; and means for connecting the supplemental springs with the auxiliary spring intermediate the ends of the auxiliary spring.

2. In a device of the class described, a main spring; an auxiliary spring; supplemental springs disposed transversely of the main and auxiliary springs and located along the sides of the main and auxiliary springs; means for connecting the supplemental springs with the main spring adjacent its ends; means for connecting the supplemental springs with the auxiliary spring intermediate the ends of the auxiliary spring; and yokes assembled with the main spring and surrounding the auxiliary spring to limit the movement thereof.

In testimony that I claim the foregoing as my own, I have hereto affixed my signature in the presence of two witnesses.

ALLISON MOFFITT.

Witnesses:
C. H. Francis,
M. N. Tremain.